July 4, 1933.  O. W. STOREY  1,916,698
DRY BATTERY
Filed Oct. 1, 1927
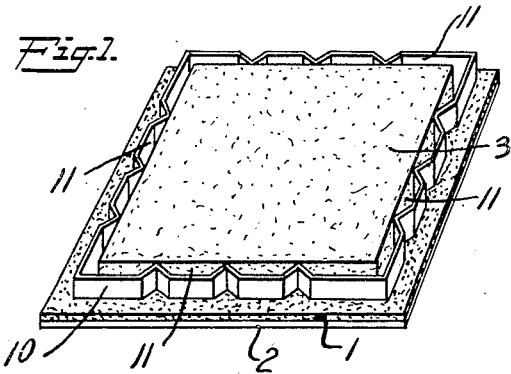
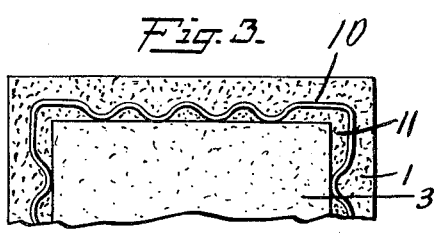
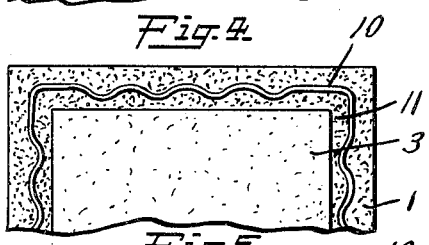
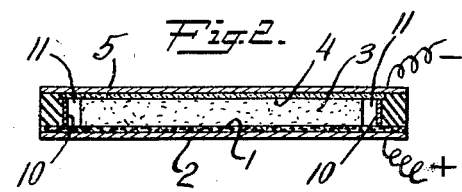
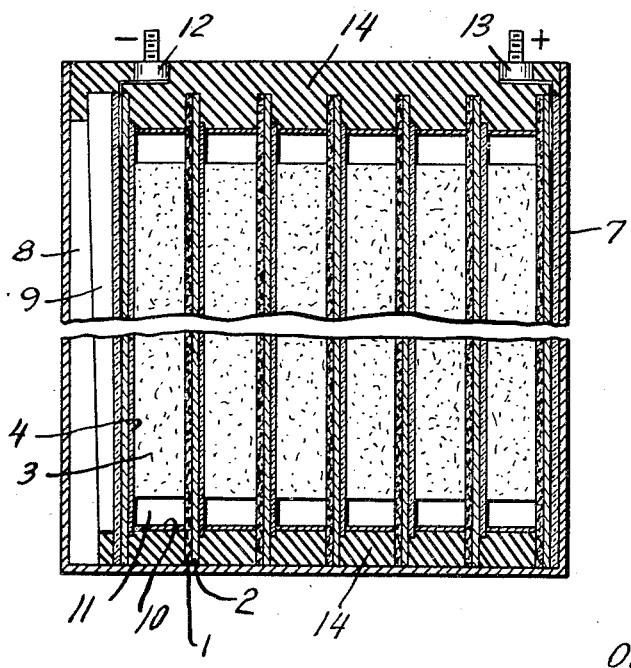
INVENTOR
Oliver W. Storey
BY
Pennie, Davis, Marvin & Edmonds
ATTORNEYS Patented July 4, 1933

1,916,698

UNITED STATES PATENT OFFICE

OLIVER W. STOREY, OF MADISON, WISCONSIN, ASSIGNOR, BY MESNE ASSIGNMENTS, TO BURGESS BATTERY CO., OF MADISON, WISCONSIN, A CORPORATION OF WISCONSIN

DRY BATTERY

Application filed October 1, 1927. Serial No. 223,335.

My invention relates to dry cells of the flat or tray type and methods of making them.

It is an object of my invention to provide a dry cell of the flat or tray type having an expansion space adjacent the edge of the mix cake. It is a further object to provide a cell of this type in which the expansion space is formed prior to sealing the cell so that the sealing may be accomplished in the usual way by inserting the assembled cell in a container and then filling the container with the sealing material. Further objects and advantages will become apparent from the following specification and drawing wherein:

Fig. 1 is a perspective view of a cell showing the shield for the expansion space adjacent the edge of the mix cake;

Fig. 2 is a cross section of a flat cell made in accordance with my invention;

Fig. 3 is a plan view of a cell showing a modified form of shield;

Fig. 4 is a similar view showing another form of shield;

Fig. 5 is a similar view showing a further modification of the shield, and,

Fig. 6 is a cross section of a sealed battery formed of a plurality of cells made in accordance with my invention.

A flat dry cell is usually built up of a thin, flat carbon or graphite cathode 1 which may consist of a thin graphite or carbon plate impregnated with paraffin or other water repellant or it may consist of a plastic graphite sheet made of powdered graphite and a moisture repellant binder such as paraffin or bees wax. Such a plastic is usually mounted on a metal plate 2 which may be the zinc anode of the adjacent cell. A flat depolarizing mix cake 3 usually consisting of graphite, manganese dioxide, sal ammoniac, zinc chloride and water contacts with the cathode 1. The flat cake is smaller in area than the cathode. The bibulous liner 4 is slightly larger in area than and contacts with the mix cake 3. A zinc anode sheet 5 contacts with liner 4. The anode area is preferably equal to the cathode area. If another cell is placed in series, a carbon cathode contacts with zinc anode 5 and a second cell is built up in the same manner as described above. Paper, cloth or other suitable tape may be used to hold a number of cells together under pressure to decrease sufficiently the contact resistance between the elements as described in the copending application of James G. Zimmerman, filed, October 1, 1927; Serial No. 223,341. Pressure between the elements may also be obtained by inserting the assembled cells with or without the tape, in a container 7 and inserting wedges 8 and 9 between the container and the end cell.

If a dry cell or a battery of a plurality of dry cells made in accordance with the above description is inserted into a container 7 and is sealed with a fluid sealing material, the sealing material contacts with the exposed edge of the depolarizing mix and completely fills the space between the projecting electrodes. If any gases and especially if any liquids are formed, as during discharge of the cell, these gases and liquids usually escape by forcing a passage along the surface of the zinc anode to the outside of the cell. If a space is provided for the collection of these gases and liquids in the interior of the cell the disastrous effect of the corrosive zinc chloride liquid oozing to the outside of the seal is prevented. Since the liquids are forced to the edge of the mix cake the expansion space should be located at that point. By my method it is possible to form expansion spaces at any desired point or along any portion of the edge of the mix cake. I accomplish this by placing a collar 10, Fig. 1, around the edge of the mix cake. The collar is preferably made of a strip of zinc chloride resisting material such as paraffin impregnated paper, tung oil saturated paper, or asphalted paper. This strip is preferably about as wide as the mix cake is thick so that it will be gripped between the carbon cathode 1 and either the bibulous partition 4 or zinc anode 5 as shown in Fig. 2. The collar may be made plain or corrugated as shown in Figs. 1, 3, 4 and 5. If made without corrugations, it should be spaced slightly away from the edge of the mix cake to allow the expansion space 11 to be formed between the strip and the edge of the mix cake. If the strip is corrugated, the inner tips of the corrugations may touch the edge of the mix cake as shown in Figs. 1 and 3. An expansion space 1/16" to 1/8" wide is sufficient. The expansion space 11 may be formed on one or more sides of the mix cake or on any portion of the edge of the mix cake.

The assembled cell or battery of cells containing the expansion space formed adjacent the edge of the mix by the strip of zinc chloride resistant material, is dropped into a container 7 which may be a paper, wooden, or other suitable box. Terminal leads 12 and 13 are fastened to the end plates of the battery. Wedges 8 and 9 may be used to secure necessary contact between the elements. A fusible sealing material 14 such as pitch is then poured over the battery to fill the container. In another sealing method some sealing material may be first poured into the container 7 and the battery set into the fused material to eliminate pocketing of air bubbles. The container is then completely filled as first described. The fusible sealing material 14 does not enter the spaces 11 adjacent the edge of the mix because of the strip 10. After the sealing material has set, the cell or battery of cells is ready for service or it may be further cartoned or assembled with other units into larger batteries.

The sealing material may also be applied to the sides of the battery in the manner described and claimed in the Zimmerman application referred to above. When the collars 10 are used, it is not necessary to so carefully regulate the amount of pitch placed in the trays that are used in this method of sealing, and the collars define the expansion spaces, and prevent the pitch from contacting with the mix cake.

I claim:

1. The method of forming an expansion space in a dry cell of the flat type which comprises placing a strip of corrugated asphalted paper adjacent the edge of the depolarizing mix during the assembly of said cell, the width of said strip being approximately equal to the thickness of said mix pressing the edges of said strip between adjacent electrodes to hold said strip in position, inserting said assembly into a container compressing said assembly, and pouring a sealing pitch around the exterior of said assembly to completely fill the space in said container on the exterior of said assembly.

2. The method of forming an expansion space in a dry cell of the flat type which comprises placing a strip of corrugated zinc chloride resisting material adjacent the edge of the depolarizing mix during the assembly of said cell, the width of said strip being approximately equal to the thickness of said mix pressing the edges of said strip between adjacent electrodes to hold said strip in position, holding said assembly firmly together while inserting said assembly into a container compressing said assembly, and pouring a sealing pitch around the exterior of said assembly to completely fill the space in said container on the exterior of said assembly.

3. The method of forming an expansion space in a dry cell of the flat type which comprises placing a strip of zinc chloride resisting material adjacent to and spaced from the edge of the depolarizing mix during the assembly of said cell, the width of said strip being approximately equal to the thickness of said mix pressing the edges of said strip between adjacent electrodes to hold said strip in position, inserting said assembly into a container compressing said assembly, and pouring a fusible seal around the exterior of said assembly while said assembly is firmly pressed together.

4. The method of forming an expansion space in a dry cell of the flat type which comprises placing a strip of zinc chloride resisting material between the electrodes and adjacent to and spaced from the edge of the depolarizing mix during the assembly of said cell, the width of said strip being approximately equal to the thickness of said mix, compressing said assembly, and pouring a fusible seal around the exterior of said assembly.

5. The steps in the method of forming an expansion space in a dry cell of the flat type which comprises placing a strip of zinc chloride resisting material adjacent to and spaced from the edges of the depolarizing mix and between adjacent electrodes, compressing said assembly to compress said strip therebetween and pouring a fusible seal around the exterior of said strip.

6. The steps in the method of forming an expansion space in a dry cell of the flat type which comprises placing a corrugated strip of zinc chloride resisting material adjacent the edge of the depolarizing mix and between adjacent electrodes, compressing said assembly to compress said strip therebetween and pouring a fusible seal around the exterior of said strip.

7. A dry cell of the flat type comprising flat electrodes in parallel spaced relation, a depolarizing mix cake between the electrodes and a strip of zinc chloride resisting material surrounding the mix cake and spaced therefrom to form an expansion space.

8. A dry cell of the flat type comprising flat electrodes in parallel spaced relation, a depolarizing mix cake between the electrodes, the electrodes being of greater area than the mix cake and a strip of zinc chloride resisting material of substantially the same width as the thickness of the mix cake, said strip being held between the electrodes and forming an expansion space around the edges of the mix cake.

9. A dry battery of the flat type comprising flat electrodes in parallel spaced relation, a depolarizing mix cake between the electrodes, and a corrugated strip of zinc chloride resisting material surrounding the mix cake and spaced therefrom to form an expansion space.

10. A dry battery comprising flat electrodes in parallel spaced relation, a depolarizing mix cake between the cathode and anode of each cell, a bibulous partition between the anode and depolarizing mix cake of each cell, and a strip of zinc chloride resisting material surrounding each of the mix cakes and spaced therefrom to form expansion spaces.

11. A dry cell of the flat type comprising flat electrodes in parallel spaced relation, a depolarizing mix cake between the electrodes, and a strip of asphalted paper surrounding the mix cake and spaced therefrom to form an expansion space.

12. A dry battery comprising flat electrodes in parallel spaced relation, each cell comprising a flat anode, a bibulous partition, a flat depolarizing mix cake, and a flat cathode, collars of zinc chloride resisting material surrounding said mix cake and spaced therefrom to form an expansion space adjacent the edge thereof, and a fusible seal closure for said battery in contact with said collars.

13. A dry cell of the flat type comprising, flat electrodes in parallel spaced relation, a depolarizing mix cake between the electrodes, and a strip of corrugated material surrounding said mix cake and spaced therefrom to form an expansion space.

14. A dry cell of the flat type comprising, flat electrodes in parallel spaced relation, a cake of depolarizing material between the electrodes, and a strip surrounding the edges of said cake and spaced therefrom to form an expansion space adjacent said edges.

15. A dry cell of the flat type comprising flat electrodes in parallel spaced relation, a cake of depolarizing material between the electrodes and a strip of zinc chloride resisting material adjacent to and spaced from the edge of said cake to form an expansion space said strip being slightly compressed between the surfaces of the adjacent electrodes and supported at its edges by said electrodes.

In testimony whereof I affix my signature.

OLIVER W. STOREY.